United States Patent
Wittorf

(10) Patent No.: US 9,975,473 B2
(45) Date of Patent: May 22, 2018

(54) MOTOR VEHICLE ROOF RAIL WITH INTEGRATED LIGHT SYSTEM

(71) Applicant: GM GLOBAL TECHNOLOGY OPERATIONS LLC, Detroit, MI (US)

(72) Inventor: Marten Wittorf, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 15/205,269

(22) Filed: Jul. 8, 2016

(65) Prior Publication Data

US 2017/0008449 A1    Jan. 12, 2017

(30) Foreign Application Priority Data

Jul. 8, 2015    (DE) ................... 20 2015 004 900 U

(51) Int. Cl.
*H01K 7/00*    (2006.01)
*B60Q 1/24*    (2006.01)
(Continued)

(52) U.S. Cl.
CPC .............. *B60Q 1/24* (2013.01); *B60Q 1/2611* (2013.01); *B60Q 1/2661* (2013.01);
(Continued)

(58) Field of Classification Search
CPC . F21V 23/02; F21V 25/12; F21V 5/00; H05B 37/0236; A63J 17/00; F21L 14/026;
(Continued)

(56) References Cited

U.S. PATENT DOCUMENTS 4,837,914 A * 6/1989 Borum .................... B60P 3/32
                                                       29/401.1
6,039,390 A * 3/2000 Agrawal .......... B32B 17/10036
                                                       296/211
(Continued)

FOREIGN PATENT DOCUMENTS

DE    102006028199 A1    12/2007
DE    102010034927 A1    2/2012
(Continued)

OTHER PUBLICATIONS

Intellectual Property Office, Search Report for United Kingdom Patent Application No. GB1611703.8 dated Dec. 20, 2016.
(Continued)

*Primary Examiner* — Minh D A
(74) *Attorney, Agent, or Firm* — Lorenz & Kopf LLP

(57) ABSTRACT

A roof rail is disposed on a motor vehicle and furnished with an integrated light system. The light system has at least one light source and one or more batteries that are part of the system arranged in or on a cover of the roof rail. The battery powered light system enables the light system to be operated independently of any connection to the onboard power supply of the motor vehicle, and it is then no longer necessary to provide an electrical connection between the light system and the onboard power supply or the motor vehicle electronics. A computer program, when executed on a light system controller, is configured to detect a position of a vehicle door and switch the at least one light source of the light system on and off.

14 Claims, 3 Drawing Sheets

(51) Int. Cl.
*B60Q 1/26* (2006.01)
*B60R 16/033* (2006.01)

(52) U.S. Cl.
CPC .......... *B60Q 1/2696* (2013.01); *B60R 16/033* (2013.01); *B60Q 2400/40* (2013.01)

(58) Field of Classification Search
CPC .... B60Q 3/0293; B60Q 11/005; B60Q 1/387; B60Q 1/2603; B60Q 3/048; B60Q 3/025; B60Q 3/0253; B60Q 3/0279; B60Q 2500/20; B60Q 1/2611; B60Q 1/24; B60Q 1/245; B60Q 1/34; B60Q 1/0483; B60R 16/03; H02K 21/48; B62J 6/001; B62J 6/003; H02J 7/1492; F24F 13/078; B60H 1/00371; B60H 2001/00235
See application file for complete search history.

(56) References Cited

U.S. PATENT DOCUMENTS

| | | |
|---|---|---|
| 6,114,954 A | 9/2000 | Palett et al. |
| 2004/0150573 A1 | 8/2004 | Henderson et al. |
| 2011/0267833 A1* | 11/2011 | Verrat-Debailleul ........ B32B 17/10036 362/545 |
| 2012/0031939 A1 | 2/2012 | Jutila et al. |
| 2012/0074841 A1 | 3/2012 | Liu et al. |
| 2013/0135880 A1 | 5/2013 | Michie et al. |
| 2014/0301101 A1* | 10/2014 | Russ ........................ B60Q 1/44 362/520 |
| 2014/0358342 A1* | 12/2014 | Marks ..................... B60L 8/003 701/22 |
| 2016/0052445 A1 | 2/2016 | Huang |

FOREIGN PATENT DOCUMENTS

| | | |
|---|---|---|
| DE | 202014002763 U1 | 4/2014 |
| EP | 2554433 A2 | 2/2013 |
| WO | 2016055467 A1 | 4/2016 |

OTHER PUBLICATIONS

German Patent Office, German Search Report for German Application No. 202015004900.1, dated Apr. 19, 2016.

* cited by examiner

MOTOR VEHICLE ROOF RAIL WITH INTEGRATED LIGHT SYSTEM

CROSS-REFERENCE TO RELATED APPLICATION

This application claims priority to German Patent Application No. 202015004900.1, filed Jul. 8, 2015, which is incorporated herein by reference in its entirety.

TECHNICAL FIELD

The present disclosure pertains to a roof rail for installation on the roof frame of a motor vehicle, wherein the roof rail includes an integrated light system. A second aspect of the present disclosure further relates to a computer program for operating a controller of light system integrated in such a roof rail. According to a further aspect, a motor vehicle equipped with a roof rail of such kind is provided.

BACKGROUND

Nowadays motor vehicles—particularly passenger cars—are equipped with many light systems, for example dipped and main beam lights, brake lights and direction indicators. The function of such light systems is either to make the vehicle visible to other road users or to illuminate the road when travelling. Interior light systems are also known, with which at least certain areas of the vehicle interior can be illuminated.

Ambient lighting systems are also known, and these are arranged in the area of a doorsill protector or on the outside of the motor vehicle. Such ambient lighting systems serve to light the immediate surroundings of the vehicle, to make it easier to get into and out of the vehicle. For example, DE 10 2010 034 927 A1 describes a device for lighting the exterior of a vehicle, having a plurality of light systems that are aligned in such manner that they illuminate an area immediately surrounding the vehicle. The light systems can be arranged in the area of a lateral roof frame of the vehicle. But the device also includes a connector to enable the system to be connected electrically to an onboard power supply of the motor vehicle.

Therefore, in order to enable operation of the system for exterior lighting, an electrical connection with the onboard power supply must be created. Since such an ambient lighting system may only be provided as an option, depending to create such a lighting system involving as little change as possible to the motor vehicle or the vehicle electronics.

SUMMARY

Accordingly, the present disclosure provides an improved exterior lighting system for a motor vehicle, which can be fitted in the vehicle or integrated in existing motor vehicle components as simply and inexpensively as possible. The construction of the exterior or ambient lighting system is characterized by simplicity and compactness. It is also possible to integrate the system in the exterior profile of the vehicle with attractive visual results.

In view of the above, in a first aspect a roof rail is provided for disposal on the roof frame of a motor vehicle. The roof rail has a roof strip that extends lengthwise and a cover that extends lengthwise. The roof rail is also furnished with an integrated light system. This is integral with the lengthwise extending cover. The light system has at least one light source and one battery that is part of the system and is arranged in or on the cover.

The provision of a battery in the system makes it possible for the light system to be operated independently of any connection to the motor vehicle's onboard power supply. If the light system that is integrated in the cover has its own light source and a battery, the light system is operable independently of the motor vehicle electronics. It is then no longer necessary to provide an electrical connection between the light system and the onboard power supply or the motor vehicle electronics in order to operate the light system. Wiring work inside the motor vehicle bodywork may advantageously be reduced correspondingly.

The integration of the light system in the lengthwise extending cover of the roof rail also enables a particularly compact accommodation requirement for the light system on the outside of the motor vehicle. Accordingly, the light system may be secured to the motor vehicle indirectly, by embedding it in a cover of the roof rail, which is provided anyway, in particular by attaching the roof rail to the roof of the motor vehicle. Because the light system is integrated in the roof rail, it is no longer necessary to install the light system in the motor vehicle roof separately, particularly on a lateral roof frame. This simplifies and streamlines the installation of such a light system.

According to a further variant, the light system is equipped with a controller, which is disposed in or on the cover. The controller is connected electrically to the battery and the at least one light source. In this case, the controller is also designed to switch the at least one light source on and off automatically. Thus, the light system operates autonomously with respect to the onboard power supply or the vehicle electronics, not only with regard to the power supply therefor, but also for purposes of its actuation. The at least one light source of the light system may be switched on or off by the controller according to a software program or a time switch, for example.

According to a further variant, the light system is also equipped with at least one sensor, by which a position of a vehicle door may be determined adjacent to a roof rail mounted on the motor vehicle. The sensor may be designed as an electrical contact switch, for example. However, it may also be designed as a capacitive or magnetic proximity sensor.

The sensor is designed particularly to generate sensor signals, the strength or shape of which correspond to the current position of the vehicle door in question. The signals that may be generated by the sensor provide an indication as to whether the vehicle door is in a closed position or an open position.

According to a further variant, the sensor is designed as a magnetic field sensor. This is provided to measure a distance from a magnetic element disposed in or on the vehicle door. For this purpose, only one magnetic element needs to be installed on the vehicle door to detect an opening or closing action of the vehicle door, as it then interacts appropriately with the magnetic field sensor in the roof rail light system arranged on the roof frame. No further modifications have to be made to the motor vehicle.

According to a further variant, the sensor is coupled to the controller or is integrated in the controller. In this context, the controller is also designed to be able to switch an at least one light source on or off independently on the basis of at least one signal generated by the sensor and transmitted to the controller.

A data link between the sensor and the controller enables the controller to process the signals generated by the sensor electronically and in terms of the data they contain, and to switch the at least one light source of the light system on or off optionally according to the detected position of the vehicle door.

In this way, it is particularly provided that the controller switches the at least one light source on in response to detection of an opening movement of the vehicle door, and the controller switches the at least one light source off in response to detection of a closing movement of the vehicle door. Motion of the vehicle door is detected by a temporally recurring or periodic measurement and comparison of the sensor signals that are calculated sequentially in this process.

According to a refinement of the present disclosure, it is further provided that the at least one battery is arranged so as to be replaceable in a closable battery compartment in the cover. The replaceable arrangement of the battery enables the battery to be replaced if its electrical energy is used up after a certain time. The at least or more light sources of the light system are preferably in the form of light emitting diodes (LED), which provide a relatively high light yield with low energy consumption.

The battery compartment is typically closable with a lid. The lid may be arranged on the cover in such manner as to be removable or pivotable or slidable to enable access to the battery compartment from outside should the need arise. In this way, the at least one battery may also be replaceable at any time when a roof rail is in the installed position on the roof frame.

According to a further variant, multiple light sources are arranged at a distance from each other along the cover. Alternatively, at least one luminous strip extending lengthwise may be arranged along the cover, the light distribution of which band is substantially spatially homogeneous along its entire lengthwise extension. The luminous strip is also actively illuminated. It may contain a number of LEDs.

The at least one light source or the luminous strip is particularly arranged on a lower overhang of the roof rail cover, so that the light beam that can be generated by the at least one light source is directed downwards at a specified angle. It is particularly provided that when the vehicle door is open, the at least one light source for illuminates example a door threshold and the adjacent ground below this in the opening range of the door.

According to a further variant, the roof rail is designed to be fastened detachably to a lateral roof frame of the motor vehicle. For this purpose, at least two fastening elements are arranged at a distance from each other in the lengthwise direction on the bottom surface of the cover.

The roof strip, which is visible from the outside, can be fastened detachably to the roof frame of the motor vehicle with the at least two fastening elements. In this context, the cover, which is positioned between the fastening elements and the roof strip, conceals the detachable connection between the roof rail and the roof frame of the motor vehicle bodywork. The roof rail provided here may be configured as an optional additional component or as extra equipment for the motor vehicle, and depending on a customer's wishes may be attached permanently to the motor vehicle during final assembly of the vehicle. Due to its detachable fastening to the roof frame, the roof rail would then be able to be disassembled and removed from the roof frame of the motor vehicle bodywork by the end user himself with the aid or a suitable tool and would be replaceable with a roof rail of a different design.

The detachable fastening concept for a vehicle roof rail extending in the lengthwise direction of the motor vehicle for which provision is made here, means that a roof rail provided here may be also be replaced with a different kind of roof rail. To this extent, the appearance of the motor vehicle may be changed by the subsequent replacement of a roof rail as desired at any time. It is further conceivable that the lengthwise extending roof rail may be fastened to the roof frame of the motor vehicle bodywork only when needed for transporting loads that are to be disposed on the vehicle roof, according to requirements in similar manner to a roof rack system.

According to a further variant, the fastening elements are connected structurally to the roof strip. In this context, a structural connection is understood to mean a connection between the fastening elements and the roof by which the load is transferred. The structural connection with the fastening elements enables the roof strip to be fastened to the roof frame of the motor vehicle bodywork in fixed, load-supporting manner. In this respect, the lengthwise extending roof strip may be used to secure a load bearing system, to secure one or more cross members of a roof rack, for example.

According to a further variant, the connection between the roof strip and the fastening element passes through an opening in the cover. The structural connection between the roof strip and the fastening elements provided for fastening the roof rail to the roof frame thus extends through the cover. In this case, the cover itself does not have to support any load itself or transmit any load to adjacent vehicle components. In this respect, the cover serves solely to conceal the fastening elements and the detachable fastening of the roof rail to the roof frame on the bodywork.

According to a further variant, the cover has a dished contour adapted to a lateral roof frame of the motor vehicle. In this context, the contour of the cover may be adapted to precisely match the contour of the lateral roof frame. In particular, the cover may lie largely in full contact with the roof frame when the roof rail is fastened to the roof frame by the at least two fastening elements.

The cover may particularly extend as a single part between the fastening elements, which are positioned apart from each other in the lengthwise direction. In this context, the cover may have a one-piece covering shell extending continuously in the lengthwise direction which conceals the at least two fastening elements from the outside.

According to a further variant, the cover has a plastic shell or a sheet metal shell. Accordingly, the cover may have the form of a shaped metal sheet or a injection molded plastic component, for example. In this respect, the shell may be manufactured particularly inexpensively and in any geometrical shape. The cover may be adapted to a very wide variety of design and geometrical requirements extremely easily by appropriate selection of the design and the specific variant of a plastic or sheet metal shell therefor.

According to a further variant, the roof strip is positioned at a distance from the cover. Consequently, a space is formed between the lengthwise extending roof strip and the cover, which extends largely parallel thereto, which space may serve to make it easier to attach additional cross members for a roof rack system, for example. In this context, the roof strip is connected to the at least two fastening elements by at least two connecting studs that pass through the cover. The connecting studs may be constructed as a single part with the roof strip. The roof strip is preferably a metal profile. The connecting studs may particularly function as base points for the roof strip, via which the roof strip is structurally connected to the fastening elements.

According to a further aspect, a computer program is also provided for operating a controller of a light system, which light system is integrated in a roof rail described previously. The computer program, when executed on a light system controller, is configured to detect a position of a vehicle door and switch the at least one light source of the light system on and off. The light source may be switched on or off depending on the detected open state of the vehicle door.

In this context, it is possible to ensure that the at least one light source is switched on and off independently or automatically by corresponding programming of the controller and with the computer program provided here. Thus, the at least one light source may be switched on and off in response to an opening or closing motion of a motor vehicle door.

According to a refinement of this feature, the computer program further provides a switch or other means for switching off the at least one light source when a preset time interval threshold value has elapsed since the light source was switched on. This creates the capability to switch off the light source automatically when it has been switched on by opening the door, for example. For example, if a vehicle door is opened, thereby causing the at least one light source of the light system to be switched on, and if the door is closed again within a relatively long period, which may be longer than a preset threshold value of 30 seconds, the light source may be switched off again automatically as it were, by the action of the computer program. This also has beneficial effects on the service life of the battery and the overall energy consumption of the light system.

According to a further aspect, a motor vehicle is provided with a motor vehicle bodywork and a lateral roof frame on which at least one roof rail as described previously is arranged. Due to the largely autonomous functioning of the light system, only very minor modifications, if any at all, need to be made to the motor vehicle to ensure operation of the light system.

According to a further variant, the at least one light source in the roof rail is arranged above a door opening in the motor vehicle bodywork. Also, magnetic element that cooperates with the light system, particularly with a sensor of the light system, is arranged on or in a upper section of the side door closest to the roof rail, typically in or on an upper section of the doorframe. When the door is in the closed position, the magnetic element may be at a minimum distance from the magnetic field sensor of the light system. An opening motion of the door increases this distance between the magnetic element and the magnetic field sensor arranged on the roof rail. Sensor signals are altered accordingly and may be processed by the controller in such manner as to cause the at least one light source to be switched on, for example.

Finally, according to a further independent aspect a method is provided for controlling a light system that has been integrated in a previously described roof rail. The method includes detecting a position of a vehicle door and automatically switching the at least one light source of the light system on or off depending on the detected state of opening of the vehicle door. The method is preferably computer-based. Typically, a sensor of the light system is provided in order to detect a position of the vehicle door.

At this point, it should be noted that all properties, features and advantages described with reference to the roof rail apply in equal measure for the computer program and the method, and vice versa.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
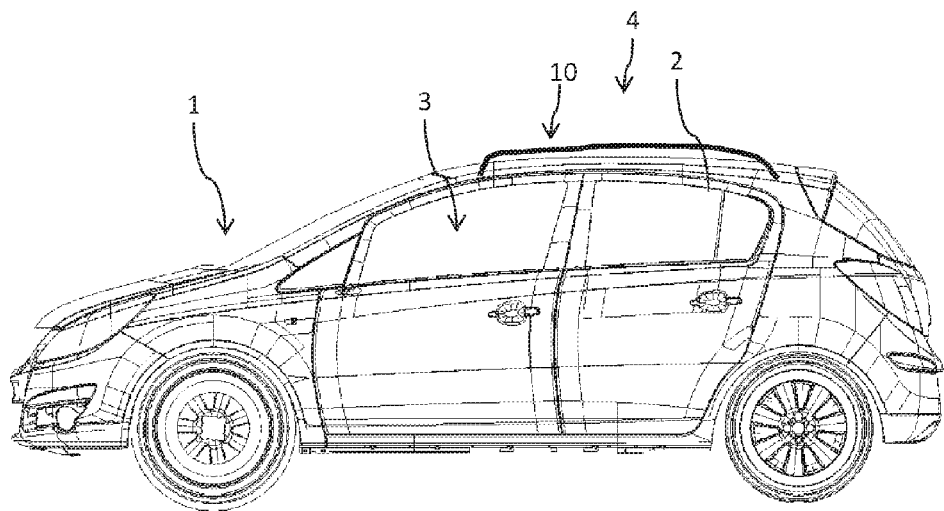
FIG. 1 is a schematic side view of a motor vehicle equipped with a roof rail.

The motor vehicle 1 shown in FIG. 1 has a self-supporting motor vehicle bodywork 2. Motor vehicle bodywork 2 provides a passenger cabin 3 for the occupants of the motor vehicle. Motor vehicle bodywork 2 further has a vehicle roof 4 with a left-side and a right-side roof frame 5. As is shown in the perspective representation of FIG. 3, the side frame, in the present case the left roof frame 5 extends in the lengthwise direction of the vehicle (x). At the front in the direction of travel of motor vehicle 1, it transitions into downwardly extending A-pillar 7. Next to the rear end of a front side door 6, roof frame 5 transitions into a. B-pillar 8, which extends substantially vertically.

Figure 3:
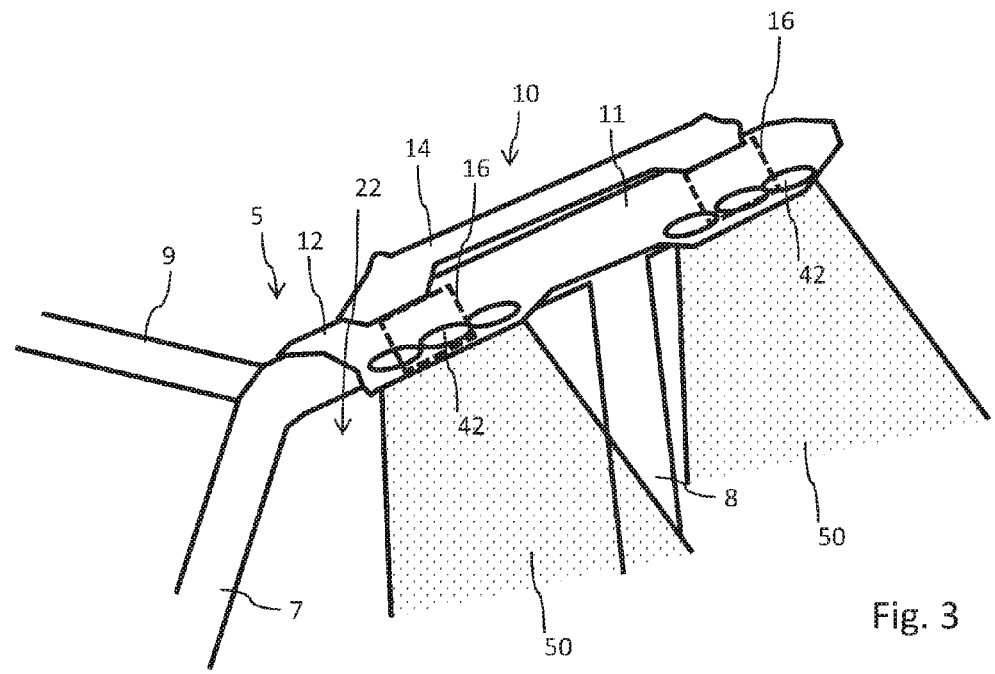
FIG. 3 is a schematic, perspective representation of the roof rail arranged on the vehicle roof.

Roof frames 5 are provided symmetrically or in identical configurations on the left and right borders of roof 4, and as suggested in FIG. 3, they are connected to one another structurally via a front cross member 9 above a front windscreen. A corresponding roof cross member (not shown) may also provided at the rear end of the roof frames.

A roof rail 10 may be detachably arranged on the left roof frame 5 as shown in FIG. 3. Roof rail 10 has a lengthwise extending roof strip 14 and a cover 12, which also extends lengthwise. Cover 12 has a top surface 11, which faces the observer, and which in the representation according to FIG. 3 is visible from the outside. The bottom surface 13 of cover 12, on the opposite side to top surface 11, has at least two fastening elements 16, which a located at a distance from each other in the lengthwise direction (x) and which are shown in cross section in FIG. 2. Fastening elements 16, which are represented only by a dashed line in FIG. 3, are located at a distance from each other that corresponds to the distance between defined fastening structures 36 on roof frame 5. In order to fasten roof rail 10 detachably to roof 4 of motor vehicle bodywork 2, the fastening elements 16 on the roof rail may be connected detachably to the respective fastening structures 36 in roof frame 5 provided for this purpose.

The area of roof frames 5 between the fastening structures 36 may be covered entirely, but at least partly, by cover 12. Cover 12 may be configured for example as a plastic or sheet metal shell. Particularly the top surface 11 thereof may be provided with a color and surface contour that lend the roof 4 and the entire motor vehicle 1 an attractive shape and a design consistent with the specifications. The roof strip 14 arranged at a distance from top surface 11 of cover 12 may also be created in a manner consistent with various design requirements and may accordingly have a configuration-specific contour or geometry. The lengthwise extending roof strip 14 may also be constructed according to a very wide range of specifications regarding color, surface constitution and choice of material. Roof strip 14 may also lie flush against cover 12 completely and over the entire lengthwise extension thereof.

Roof strip 14 is connected directly and structurally to the at least two fastening elements 16. This enables the roof strip to be fastened to roof frame 5 as a load-bearing structural component. As suggested in FIG. 2, a downwardly protruding connecting stud provided on the lengthwise end of roof strip 14 passes through an opening in cover 12 that is designed ensure perfect fit of the stud. In this way, roof strip 14 is connected directly to fastening element 16 via the connecting stud.

Figure 2:
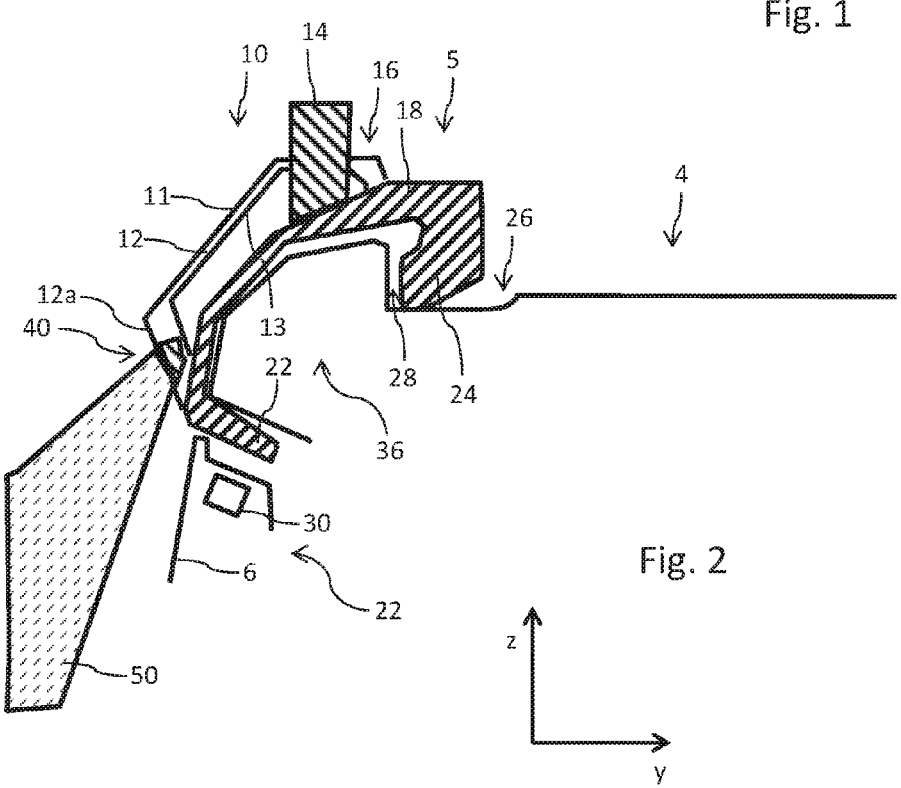
FIG. 2 is a cross section through the roof rail with integrated light system arranged on the vehicle roof.

Lower leg 20 is particularly designed to be inserted in an intermediate space between roof frame 5 and an upper edge of a side door 6. An area of retaining clip 18 that is visible in the assembled position is completely concealed by cover 12, so that in the final assembly position on roof frame 5, as shown in FIG. 2, fastening element 16 is not visible from the outside.

In the present example, the fastening element provided on the roof rail is in the form of a kind of retaining clip 18. It may be attached to a profile of roof frame 5 by positive locking and/or non-positive locking or clamping means. Retaining clip 18 may particularly be configured as a mounting clip. Retaining clip 18 has a lower leg 20, which engages in an upper door gap and an upper leg 24, which is brought into position flush against the top of roof frame 5. Retaining clip 18 may particularly have a C-shaped cross section.

The free ends of the upper legs 20, 24, which are in this respect opposite one another, may also be positioned variably with respect to each other. For example, it is conceivable that at least one of the leas 20, 24 may be arranged so as to be movable on retaining clip 18 and that it may be displaced or fixed or clamped with a fixing device. In this way, retaining clip 18, and therewith the entire roof rail may be arranged detachably on roof frame 5 of motor vehicle bodywork 2. In the present example, upper leg 24 is brought into position in a peripheral channel 26 in the transition from the substantially flat vehicle roof 4 to lateral roof frame 5. An undercut area 28 is formed in the transition between channel 26 and roof frame 5, which projects slightly above roof 4, and upper lea 24 may be brought into positive locking engagement with this undercut area. An inwardly and upwardly projecting pin or cam may be formed on lower leg 20, and may be inserted in a precisely dimensioned mounting opening provided for this purpose in roof frame 5.

Although the roof rail 10 is represented in the figures as a separate roof rail 10 that is detachable or removable from vehicle roof 4, there are also embodiments of the present disclosure in which roof rail 10 may be permanently, non-detachably fixed on roof frame 5.

Figure 4:
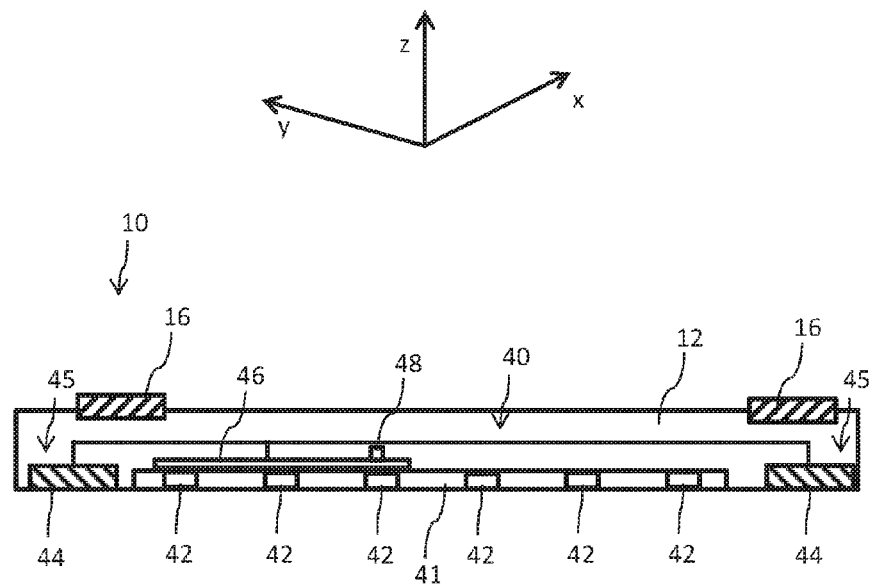
FIG. 4 is a schematic cross section through the cover of the roof rail.

A light system 40 is represented schematically with all of the components thereof in FIG. 4, and is integrated in cover 12 of roof rail 10. As is also shown schematically in FIG. 3, it may be equipped with a plurality of light sources 42 arrange at a distance from each other in lengthwise direction (x). Alternatively, a continuous luminous strip 41 may be provided, as shown in FIG. 4. Light source 42 or luminous strip 41 may particularly be arranged on a downwardly sloping outer ridge 12a of the cover 12 for roof rail 10, so that a light beam 50 produced by light sources 42 shines downwards at an angle and thus illuminates the vehicle underbody or a door sill protector. The outer ridge 12a may particularly be in the form of an overhang that protrudes outwards and downwards.

The light system 40 shown schematically in cross section in FIG. 4 is furnished at least one battery 44 besides light sources 42 or luminous strip 41, by which the at least one light source 42 may be supplied with electrical power. Light sources 42 are also coupled to a controller 46, which in turn is also connected electrically to the at least one battery 44. Controller 46 may incorporate a sensor 48 or it may be connected via a data link to a sensor disposed outside o controller 46.

In the representation according to FIG. 4, a total of two battery compartments 45 are shown, located in the cover 12 of roof rail 10, each of which can accommodate one or more batteries 44. Battery compartments 45 are preferably both accessible from the side of cover 12 on which light sources 42 are also arranged. This means that battery compartments 45 are preferably also provided on the downwardly sloping outer ridge 12a of cover 12 on roof rail 10. In this way, good accessibility is guaranteed for when batteries 44 need to be replaced.

Sensor 48 is particularly designed as a proximity sensor. For example, it may be in the form of a magnetic sensor or a magnetic field sensor. In order to detect an opening or closing position, or an opening or closing motion of motor vehicle door 6, a magnetic element 30 is arranged preferably in the upper area of motor vehicle door 6, that is to say the door frame, and at a minimum distance from sensor 48 when door 6 is in the closed position. When door 6 is opened, the distance between magnetic element 30 and sensor 48 increases.

The sensor signals generated by sensor 48 change accordingly, so that the controller 46 connected thereto can detect that the door has been opened. After an opening motion of door 6 has been detected, controller 46 is designed to switch on at least one of light sources 42.

Figure 5:
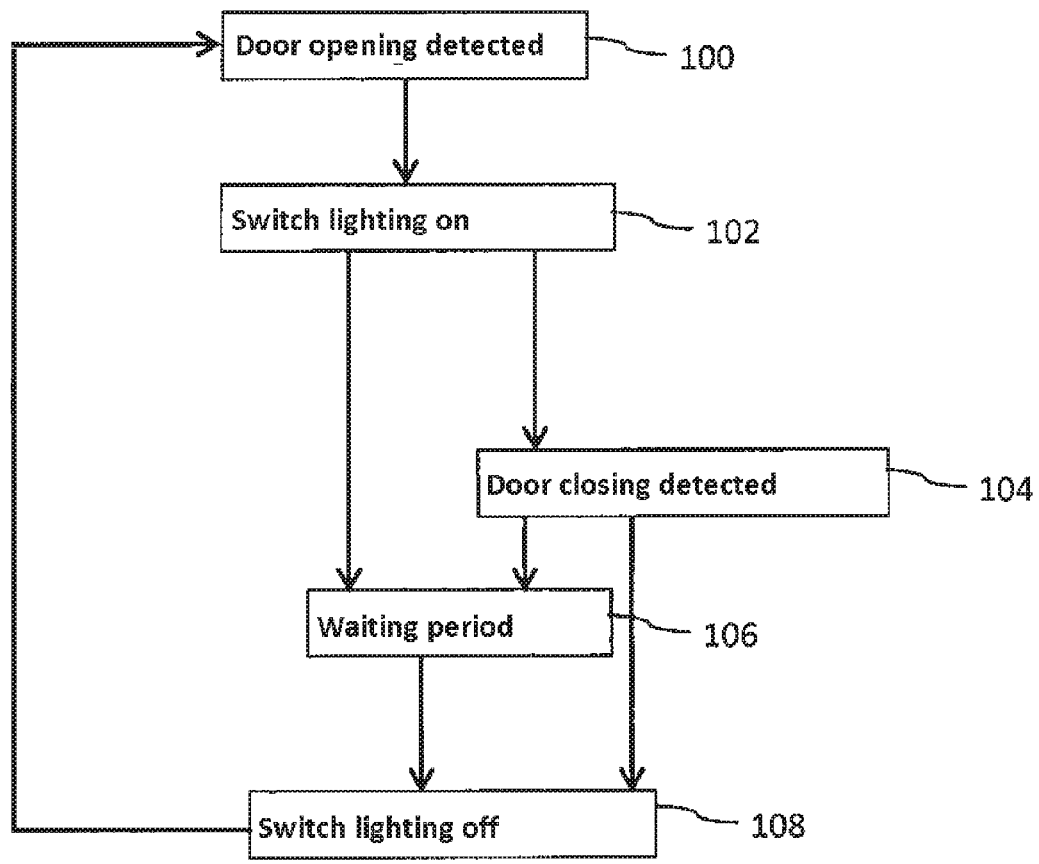
FIG. 5 is a flowchart representing the mode of operation of a controller of the light system integrated in the roof rail.

The function of controller 46 is illustrated in greater detail in the flowchart according to FIG. 5. In a first step 100, controller 46 detects the opening of a door. Immediately upon detecting the opening of the door, in step 102 controller 46 switches at least one light source 42 of light system 40 on. Light system 40 may remain activated until sensor 48 in cooperation with controller 46 detects a closing of the door in step 104. A soon as the it is detected that the door has been closed, light system 40 is switched off again in step 108.

Optionally, it may be provided for the light system to be deactivated automatically. For example, when the lighting system is switched on after step 102, controller 46 may also wait for a preset time interval. If a closure of the door is not detected within the time interval preset in step 106, controller 46 may independently deactivate light system 40, that is to say independently switch off the at least one light source 42 that was switched on previously.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A roof rail for arrangement on the roof frame of a motor vehicle comprising:
   an elongated roof strip;
   an elongated cover disposed over the roof strip;
   a light system integrated in the cover and including a battery and a light source incorporated therein; and
   a sensor configured to detect a position of a vehicle door located adjacent to the roof rail, wherein the light source is switchable based on the detected door position.

2. The roof rail according to claim 1, further comprising controller incorporated into the light system and electrically connected to the battery and to the light source and configured to switch the light source on and off automatically.

3. The roof rail according to claim 1, wherein the sensor comprises a magnetic field sensor configured to measure a distance from a magnetic element arranged on or in the vehicle door.

4. The roof rail according to claim 1, wherein the sensor is in communication with the controller and the controller is configured to switch the light source on or off in response to a signal generated by the sensor and communicated to the controller.

5. The roof rail according to claim 1, wherein the cover comprises a closable battery compartment configured to receive a replaceable battery.

6. The roof rail according to claim 1, wherein the light system further comprises a plurality of light sources are arranged in spaced relation along the cover.

7. The roof rail according to claim 1, wherein the light system further comprises a luminous strip arranged lengthwise along the cover.

8. The roof rail according to claim 1, further comprising at least two fastening elements provided on a bottom surface of the cover and located at a distance from each other in lengthwise direction to enable the roof rail to be attached detachably to a lateral roof frame of the motor vehicle.

9. The roof rail according to claim 8, wherein the fastening element are connected structurally to the roof strip.

10. The roof rail according to claim 1, wherein the cover is configured with a dished contour adapted to match the lateral roof frame of the motor vehicle.

11. A motor vehicle comprising a vehicle body having a lateral roof frame with at least one roof rail according to claim 1 arranged thereon.

12. The motor vehicle according to 11, wherein the light source is arranged on the roof rail above a door opening in the vehicle work, and the sensor comprises a magnetic element arranged in an upper section of a side door supported in the door opening and cooperating with the light system for selectively switching the light source on and off based on an open position of the vehicle door relative the door opening.

13. A non-transitory computer readable medium comprising a computer program, which when executed on a controller for a light system integrated in a roof rail, is configured to:
   detect a position of a vehicle door; and
   switch the a light source in the light system on and off in response to the detected position the vehicle door.

14. The non-transitory computer readable medium of claim 13, wherein the computer program, when executed on the controller, is configured to switch the light source off after a preset time has expired since the light source was switched on.

* * * * *